United States Patent [19]

Osawa

[11] Patent Number: 5,024,311
[45] Date of Patent: * Jun. 18, 1991

[54] ELECTROMAGNETIC SPRING CLUTCH

[75] Inventor: Masanori Osawa, Iida, Japan

[73] Assignee: Tenryu Marusawa Kabushiki Kaisha, Nagano, Japan

[ * ] Notice: The portion of the term of this patent subsequent to Jul. 11, 2006 has been disclaimed.

[21] Appl. No.: 392,525

[22] PCT Filed: Jan. 25, 1988

[86] PCT No.: PCT/JP88/00055
§ 371 Date: Jul. 25, 1989
§ 102(e) Date: Jul. 25, 1989

[87] PCT Pub. No.: WO88/05958
PCT Pub. Date: Aug. 11, 1988

[30] Foreign Application Priority Data

Jan. 28, 1987 [JP] Japan .................................. 62-011194

[51] Int. Cl.$^5$ ............................................. F16D 27/00
[52] U.S. Cl. ................................ 192/84 T; 192/81 C; 192/90
[58] Field of Search .............. 192/84 T, 81 C, 12 BA, 192/90, 35; 335/281

[56] References Cited

U.S. PATENT DOCUMENTS

| 3,684,068 | 8/1972 | Ford | 192/81 C |
| 4,053,858 | 10/1977 | Aidn et al. | 335/281 |
| 4,263,995 | 4/1981 | Wahlstedt | 192/84 T |
| 4,321,992 | 3/1982 | Gallo | 192/84 T |
| 4,443,775 | 4/1984 | Fujitani et al. | 335/281 |
| 4,630,722 | 12/1986 | Figueira et al. | 192/84 T |
| 4,846,324 | 7/1989 | Oshawa | 192/84 T |

FOREIGN PATENT DOCUMENTS

| 52721 | 6/1982 | European Pat. Off. | 192/84 T |
| 1441544 | 7/1976 | United Kingdom | 335/281 |

OTHER PUBLICATIONS

The PSI Magnetic Spring Clutch (MSC), Warner Electric Brake & Clutch Co., copy 1973.

Primary Examiner—Allan D. Herrmann
Assistant Examiner—Andrea Pitts
Attorney, Agent, or Firm—Jordan and Hamburg

[57] ABSTRACT

The present invention relates to an electromagnetic spring clutch. A conventional field core is formed in a bottomed cylindrical shape, so manufacturing such a field core is troublesome and uneconomical. When a through-hole through which shafts are inserted is provided in one or both of vertical walls of a U-shaped plate, a field core is provided simply and inexpensively.

7 Claims, 3 Drawing Sheets

ELECTROMAGNETIC SPRING CLUTCH

FIELD OF TECHNOLOGY

The present invention relates to an electromagnetic spring clutch.

BACKGROUND OF TECHNOLOGY

A conventional electromagnetic spring clutch is shown in FIG. 4.

A field core 400 is made of magnetizable material and formed in a bottomed cylinder. There is bored a throughhole 406 through which an axle 404 is inserted in the bottom section 402 of the field core 400.

An electromagnetic coil 408 is fixed in the field core 400 and fixed therein by suitable means such as caulking, adhering, etc.

An armature 410 is also made of magnetizable material and there is provided a flange 412 on the outer face thereof.

When the electric current passes the electromagnetic coil 408, then the armature 410 is attached to shift toward the electromagnetic coil 408. With the shift of the armature 410 in the axial direction thereof, the inner diameter of a coil spring, not shown, is reduced or increased to control whether torque is transmitted or not transmitted. Note that, the magnetic circuit is closed via the field core 400, the flange 412 of the armature 410 and the cylinder section of the armature 410 when the electric current passes through the electromagnetic coil 408.

DISCLOSURE OF THE INVENTION

However, the conventional electromagnetic spring clutch has the following disadvantages.

To form the field core in the bottomed cylindrical shape, drawing or cutting is required, so that machining work is troublesome and machining cost is increased.

Therefore, the object of the present invention is to provide an economical electromagnetic spring clutch whose field core can be formed easily and whose machining cost can be reduced. The electromagnetic spring clutch is characterized in that the field core is formed into U shape in section and an insert-section is opened through one or both of the vertical walls of the field core to pass therethrough axles, etc.

In the present invention, the field core is formed by an easy machining work, so that manufacturing efficiency of the electromagnetic spring clutch can be raised and economical ones can be provided.

EMBODIMENTS

Preferred embodiments of the present invention will now be described in detail with reference to accompanying drawings.

Figure 1:
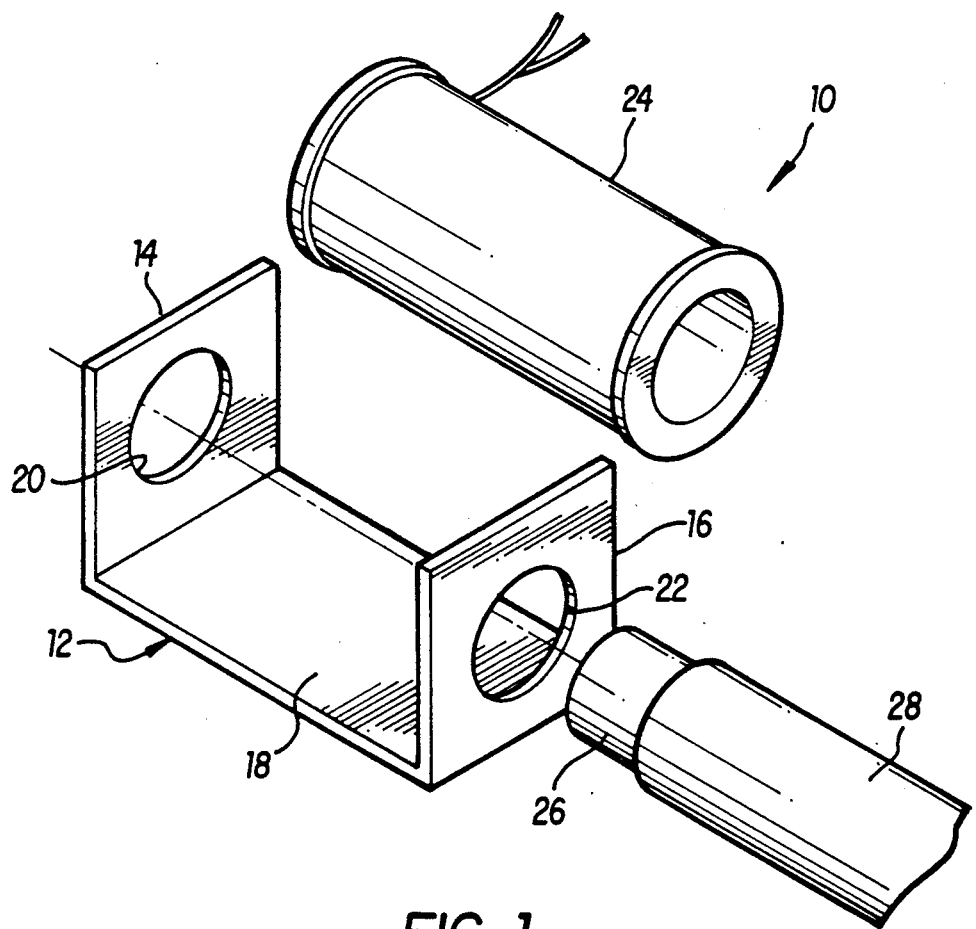
FIG. 1 shows an exploded view of a principal part of the electromagnetic clutch of the present invention.

First, an electromagnetic clutch is described in outline with reference to FIG. 1.

A field core 12 is made of such magnetizable material as iron, etc. Vertical walls 14 and 16 are vertically provided at each end of a connecting section 18. The field core 12 is formed into U shape by bending a rectangular iron plate. There are bored through-holes 20 and 22 in the vertical walls 14 and 16.

In an electromagnetic coil 24 a suitable amount of wire is wound to generate enough magnetic force.

Next, a detailed example is described with reference to FIGS. 2(a) and 2(b).

A field core 100 has vertical walls 102 and 104, bored through-holes 103 and 105 and a connecting section 106 connecting the vertical walls 102 and 104. An electromagnetic coil 108 is accommodated in the field core 100, and a suitable amount of wire is wound thereon to generate enough magnetic force.

An armature 110, which is a hollow round rod, is provided in the center hole of the electromagnetic coil 108. The armature 110 can be moved in the center hole 109 in the axial direction.

Torque from suitable drive means (not shown) is inputted to an input gear 114 which is provided at the end section of a master driving axle 112.

A slave driving axle 116 is inserted through the electromagnetic coil 108 and fixed to a driven axle 118 by a bolt 120. Note that, the master driving axle 112 rotatably covers over the slave driving axle 116.

A coil spring 122 is provided in the armature 110 and covers and bridges over the outer faces of the master driving axle 112 and the slave driving axle 116. One end of the coil spring 122 is engaged with the inner face of the armature 110 and the other end is engaged with the outer face of the master driving axle 112.

Figure 2A:
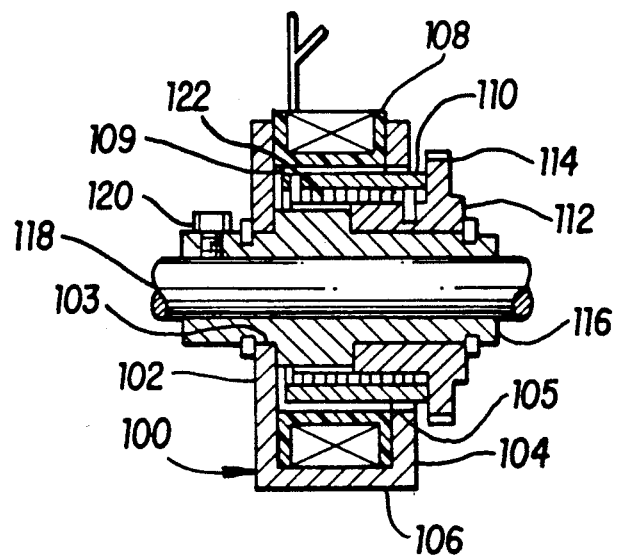
FIG. 2 shows sectional views thereof in which (a) shows the state of no electric current passing through the electromagnetic coil and (b) shows the state of electric current passing therethrough.

In the state shown in FIG. 2(a), no electric current passes through the electromagnetic coil 108, the master driving axle 112 and the armature 110, which are connected by the coil spring 122, are rotated together by the torque inputted to the input gear 114 of the master driving axle 112. Meanwhile, the slave driving axle 116 and the driven axle 118 which is fixed to the slave driving axle 116 are at a standstill.

Figure 2B:
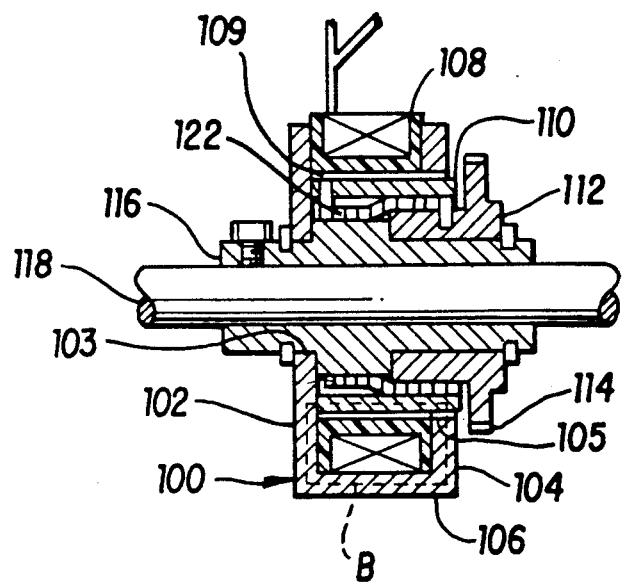

When the electric current passes through the electromagnetic coil 108, the electromagnetic coil 108 is magnetized and the magnetic circuit as shown by dotted line B in FIG. 2(b), is closed so that enough magnetic force is generated to attract the armature 110 to contact the vertical wall 102 of the field core 100. As a result of the attracting of the armature 110, the rotation of the armature 110 is braked, so that there occurs a difference between the rotation speed of the armature 110 and the master driving axle 112. With the difference, the inner diameter of the coil spring 122 is reduced, and the coil spring 122 tightens on the master driving axle 112 and the slave driving axle 116 to connect the both, so that the master driving axle 112 and the slave driving axle 116 rotate together. Then the driven axle 118 is also able to be rotated.

Figure 3:
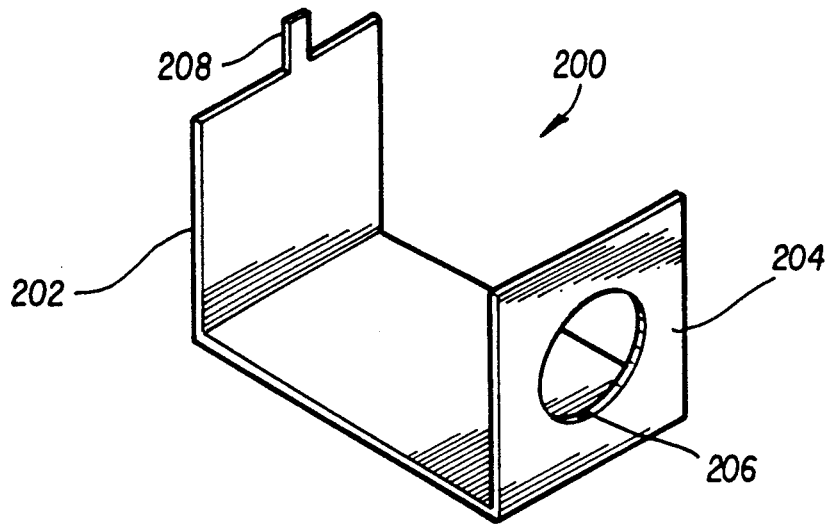
FIG. 3 shows a perspective view of a field core of another embodiment.
Figure 4:
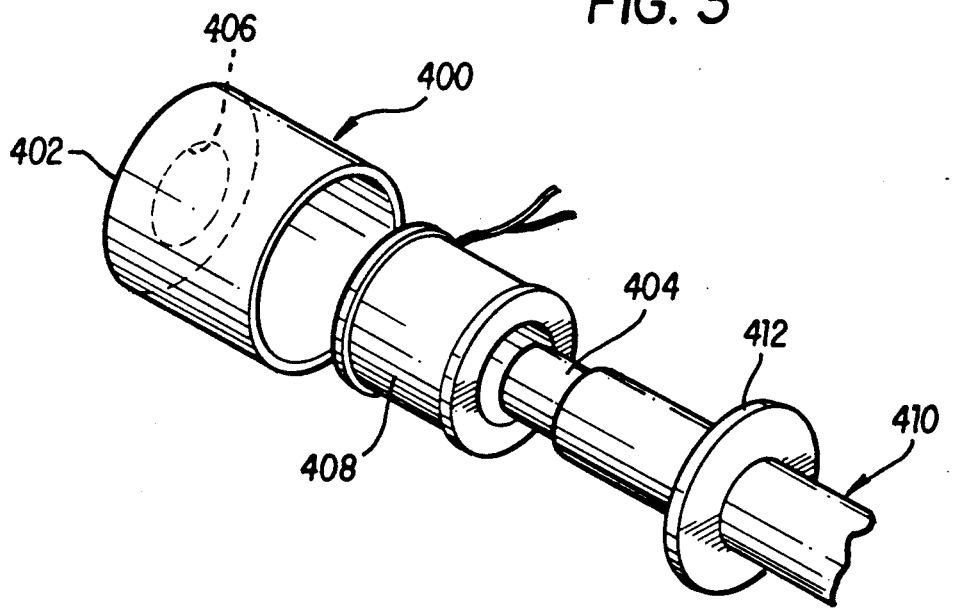
FIG. 4 shows an exploded view of a principal part of conventional electromagnetic spring clutch.

Next, another embodiment is described with reference to FIG. 3.

An engaging means 208 is extended from a vertical wall 202, and it can be engaged with a suitable member (not shown) to hold rotation of a field core 200 when an electromagnetic spring clutch is affixed. The engaging means, of course, may be provided in both of the vertical walls.

There are other embodiments, not shown. For example, a boss may be projected on an end face of a spool of an electromagnetic coil to fit into a slit which is provided in a vertical wall of a field core. Therefore, the electromagnetic coil is prevented from rotating relative to the field core. More than two engaging means may be provided and it also may be provided in both of the vertical walls.

There are also other methods to form field cores. One method comprises a step of cutting an elongated rod having U shape in section perpendicular to its axial direction and a step of opening one or a plurality of insert-sections such as through-holes. Field cores also may be made by connecting vertical walls having the insert-sections to the connecting section. Moreover, a ferrous oilless bearing may be attached in the insert-section of the field core to prevent wear and the insert-section may be a slit instead of a through-hole.

Preferred embodiments have been described in detail, but the present invention is not limited to the embodiments. Many modifications can be allowed without deviating from the scope of the invention.

I claim:

1. An electromagnetic spring clutch comprising,
   a field core being of U shape in section and being in the form of a pair of mutually parallel, spaced end walls and a connecting wall perpendicular to said end walls and connecting said end walls together at a respective edge of each of said end walls, at least one of said end walls having an opening therethrough, said armature being rotatably received in each said opening, and an electromagnetic coil accommodated in the field core;
   a slave driving axle rotatably inserted through the center hole of said electromagnetic coil, said slave driving axle being hollow;
   a driven axle inserted through said slave driving axle and connected thereto so as to rotate therewith;
   a master driving axle rotatably covering over said slave driving axle, said master driving axle having an input gear at one end section thereof;
   an armature provided in the center hole of said electromagnetic coil, said armature rotatably, covering and bridging over said slave driving axle and said master driving axle, said armature being capable of shifting in the axial direction thereof, and one end face of said armature being attracted to contact the inner face of one of said end walls when electric current passes through said electromagnetic coil; and
   a coil spring provided between said armature and the outer faces of said master driving axle and said slave driving axle, one end of said coil spring being engaged with said armature and the other end thereof being engaged with said master driving axle, said coil spring tightening upon said slave driving axle when electric current passes through said electromagnetic coil.

2. In an electromagnetic spring clutch for mutually engaging or disengaging a master driving axle and a slave driving axle by shift of an armature in the axial direction thereof,
   an electromagnetic coil accommodated in a field core for shifting said armature,
   said field core being of U shape in section and being in the form of a pair of mutually parallel, spaced end walls and a connecting wall perpendicular to said end walls and connecting said end walls together at a respective edge of each of said end walls, at least one of said end walls having an opening therethrough, said armature being rotatably received in each said opening.

3. The electromagnetic spring clutch according to claim 2, wherein engaging means to engage with suitable member to hold the rotation of said field core when said electromagnetic coil is fixed is provided in said field core.

4. The electromagnetic spring clutch according to claim 3, wherein said engaging means is an extended piece which is extended from at least one said end wall of said field core.

5. The electromagnetic spring clutch according to claim 2, wherein each said opening is a through-hole bored in said end wall.

6. The electromagnetic spring clutch according to claim 2, wherein said armature is a hollow round rod.

7. In an electromagnetic spring clutch for mutually engaging or disengaging a master driving axle and a slave driving axle by shift of an armature in the axial direction thereof,
   an electromagnetic coil accommodated in a field core for shifting said armature,
   said field core being made by cutting a rod which is U shape in section perpendicular to the axis of said rod, being of U shape in section and being in the form of a pair of mutually parallel, spaced end walls and a connecting wall perpendicular to said end walls and connecting said end walls together at a respective edge of each of said end walls, at least one of said end walls having an opening therethrough, said armature being rotatably received in each said opening.

* * * * *